United States Patent Office 3,525,750
Patented Aug. 25, 1970

3,525,750
1,2,3,4,5,6-HEXAHYDRO-AZEPINO[4, 5-b] INDOLE DERIVATIVES
Ulrich Renner, Riehen, Switzerland, assignor to Geigy Chemical Corporation, Ardsley, N.Y., a corporation of New York
No Drawing. Filed May 29, 1967, Ser. No. 642,214
Claims priority, application Switzerland, May 31, 1966, 7,853/66, 7,854/66
Int. Cl. C07d 27/54
U.S. Cl. 260—326.5         9 Claims

ABSTRACT OF THE DISCLOSURE 1,2,3,4,5,6-hexahydro-azepino[4,5-b] indole derivatives and 1,2,3,6 - tetrahydro-azepino[4,5-b]indole derivatives which are useful as antitussive agents; therapeutical compositions containing these derivatives and processes for producing an antitussive effect in mammals. Illustrative embodiments are 3 - methyl-6-benzyl - 1,2,3,4,5,6-hexahydro-azepino[4,5-b]indol-5-ol and 3-methyl-6-benzyl-1,2,3,6-tetrahydro-azepino[4,5-b]indol-5(4H)-one.

DETAILED DISCLOSURE

This invention relates to 1,2,3,4,5,6-hexahydro-azepino [4,5-b]indole derivatives and 1,2,3,6-tetrahydro-azepino [4,5-b] indole derivatives having valuable pharmacological properties. More particularly the present invention pertains to 1,2,3,4,5,6-hexahydro-azepino[4,5-b]indol-5-ols and 1,2,3,6-tetrahydro - azepino[4,5-b]indol-5(4H)-ones and to acid addition salts thereof. The invention is further concerned with processes for the production of these compounds and these addition salts and also pertains to therapeutical compositions containing said compounds or their pharmaceutically acceptable addition salts as well as to processes for producing an antitussive effect in a mammal by administering said mammal a therapeutically effective amount of a compound or pharmaceutically acceptable acid addition salt thereof according to the invention.

Compounds of the formula

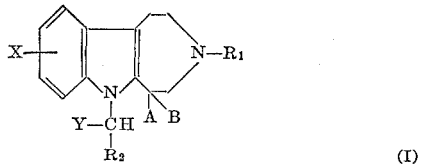

(I)

wherein

A and B represent individually hydrogen and hydroxy or together the oxo group,
X represents hydrogen, halogen up to the atomic number 35, lower alkyl or lower alkoxy,
Y represents phenyl or phenyl substituted by halogen up to the atomic number 35, lower alkyl or lower alkoxy,
$R_1$ represents lower alkyl or benzyl, and
$R_2$ represents hydrogen or lower alkyl and their addition salts with inorganic or organic acids have not been known up to now.

The term "lower alkyl" as used herein per se and as included in the term "lower alkoxy" means saturated monovalent aliphatic groups of the general formula —$C_mH_{2m+1}$ wherein $m$ designates an integer of less than 5 and is inclusive for both straight and branched chain groups. Illustrative of such alkyl groups are methyl, ethyl, n-propyl, isopropyl, n-butyl, isobutyl or tert. butyl.

In connection with $R_1$ lower alkyl is, e.g., methyl, ethyl or n-propyl. $R_2$ is preferably hydrogen or methyl.

Illustrative of alkoxy groups are methoxy, ethoxy, n-propoxy, isopropoxy or n-butoxy.

The term "halogen up to the atomic number 35" is inclusive for fluorine, chlorine or bromine.

By "phenyl substituted by halogen up to the atomic number 35, lower alkyl or lower alkoxy" is meant, e.g., fluorophenyl, chlorophenyl, bromophenyl, methylphenyl, ethylphenyl, isopropylphenyl, dimethylphenyl, methoxyphenyl, ethoxyphenyl, n-propoxyphenyl, isopropoxyphenyl or dimethoxyphenyl.

These compounds and their acid addition salts have now been found to have a strong antitussive action together with a suitable therapeutic index. They do not demonstrate analgesic activity. Accordingly, these compounds and their acid addition salts are useful for producing antitussive effects and treating coughs in mammals.

Of special interest are those compounds of the invention wherein in the above formula A and B represent individually hydrogen and hydroxy or together the oxo group, X represents hydrogen or chlorine, Y represents phenyl or phenyl substituted by lower alkoxy, $R_1$ represents lower alkyl, and $R_2$ represents hydrogen. Representative compounds within this scope which have been found to possess antitussive properties to a favorable degree are particularly the following: 3-methyl-6-benzyl-1,2,3,4,5,6-hexahydro-azepino[4,5-b]indol-5-ol, 3 - ethyl-6-benzyl - 1,2,3,4,5,6 - hexahydro-azepino[4,5-b]indol-5-ol, 3-methyl-6-(m-methoxybenzyl) - 1,2,3,4,5,6-hexahydro-azepino[4,5-b]indol - 5-ol, 3-methyl-6-benzyl-9-chloro - 1,2,3,4,5,6 - hexahydro-azepino[4,5-b]indol-5-ol, 3-methyl-6-benzyl-1,2,3,6-tetrahydro - azepino[4,5-b]indol-5(4H)-one, 3-methyl - 6 - (m - methoxybenzyl)-1,2,3,6-tetrahydro - azepino[4,5-b]indol-5(4H)-one, and 3-methyl-6-benzyl-9-chloro-1,2,3,6-tetrahydro - azepino[4,5-b]indol-5(4H)-one.

Merely by way of illustration, the antitussive activity of 3-methyl-6-benzyl-1,2,3,4,5,6-hexahydro - azepino[4,5-b] indol-5-ol (I) and of 3-methyl-6-benzyl-1,2,3,6-tetrahydro-azepino[4,5-b]-indol-5(4H)-one(II), for instance, is determined according to R. Domenjoz, Archiv für experimentelle Pathologie und Pharmacologie 215, 19–24 (1952). The test is carried out by narcotizing healthy cats of normal weight with a suitable narcotic. Doses of 30–65 mg./kg. of aprobarbital are applied intraperitoneally to obtain a relatively superficial narcosis. About 45 minutes after the injection of the narcotic, the preparation of the Nervus laryngeus superior is started, by fitting on an irritation-electrode. An apparatus manufactured by "GRASS Medical Instruments," Type SD5, allowing irritation of the aforesaid nerve with rectangular current-impulses of any desired frequency and intensity is connected to the electrode. The irritation-frequency applied is 5 cycles at an irritation-intensity between 0.5 and 3 volts. The irritation-duration is about 8 seconds and the interval between two irritations is about 120 seconds. For the registrations of the cough reflexes, a Marey capsule is used. A respiration-cannula is introduced through the oral cavity down to the glottic chink. The compounds to be tested are injected intravenously in the form of 1% aqueous solutions of their hydrochloride and hydrogensulfate, respectively.

Compounds I and II exhibit in this test in dosages of 1–2 mg./kg. and 0.5 mg./kg., respectively, excellent antitussive activity.

In another test guinea pigs are exposed in a gas-chamber to a defined gas-mixture flowing through the said chamber and consisting of 10.5 liters of air, 1.5 liters of carbon dioxide and approximately 20 cubic centimeters of sulfur dioxide. The animals are exposed 120 seconds maximum to said mixture.

Compound I, given 50 mg./kg. orally, excellently inhibited in this test the sulfur dioxide induced irritation cough.

To produce the compounds of Formula I and their acid addition salts, a compound of Formula II

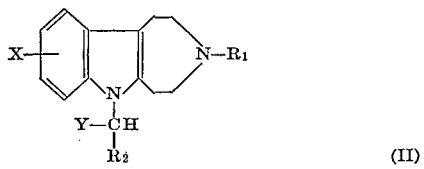

wherein X, Y, $R_1$ and $R_2$ have the meaning given in Formula I, is reacted with mercury-(II)-acetate in aqueous acetic acid solution. The reaction is preferably performed in the cold e.g. at between 0° and 20°.

Thereby a compound of the general Formula III

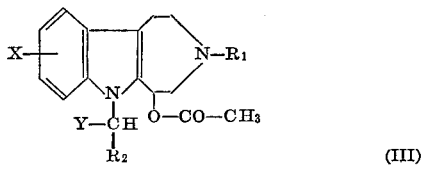

is obtained, wherein X, Y, $R_1$ and $R_2$ have the meaning given in Formula I, which is hydrolysed in the known way, e.g. by heating with inorganic bases in an organic, aqueous-organic or aqueous medium to yield compounds of the general Formula I, wherein the symbols A and B represent hydrogen and the hydroxy group. If desired the so obtained compound of general Formula I can be transformed by oxydation with chrom-trioxide into other compounds of general Formula I, wherein A and B represent the oxo group. The compounds of general Formula I can also be transformed into their acid addition salts with inorganic and organic acids.

The reaction of a compound of general Formula II with mercury-II acetate is carried out in aqueous acetic solvent, preferably in the cold, e.g. at a temperature of between 0 and 20° C. The progress of the reaction can easily be followed by the formation of mercuro ions and separation out of the more difficulty soluble mercury-(I) acetate. Two mols of mercury-(II) acetate are used per mol of compound of the general Formula II, i.e. they are reduced. Separation of the mercury ions and isolation of the reaction product can be performed in the known way.

If desired, the acetoxy compounds of general Formula III obtained according to the invention are hydrolysed in the known way into the corresponding free hydroxy compounds of general Formula I, e.g. by heating with inorganic bases or acids in organic, organic-aqueous or aqueous medium; for example hydrolysis occurs on boiling with methanolic potassium hydroxide solution.

The compounds of the general Formula I, wherein the symbols A and B represent hydrogen and the hydroxy group can be oxidised, if desired into other compounds of the general Formula I wherein A and B represent the oxo group. This oxidation is carried out with chromium trioxide. Preferably basic or neutral organic solvents serve as reaction medium, such as pyridine or dimethyl formamide. The oxidation is preferably performed in the cold, e.g. at temperatures between 0° and 25°. Preferably 2–3 mols of chromium trioxide are used per mol of hydroxy compound.

According to a modification of the process, compounds of the general Formula I, wherein the symbols A and B represent hydrogen and the hydroxy group, can also be produced directly from those of general Formula II by reacting the latter with periodic acid in aqueous-organic, e.g. aqueous-methanolic solution. The oxidation is preferably performed in the cold, e.g. at temperatures between 0° and 20°. Theoretically, one mol of periodic acid is reduced to iodic acid per mol of compound of general Formula II. As, on the one hand, the reaction proceeds slowly but, on the other, in the formation of the compound of general Formula I it does not remain stationary, an excess of periodic acid can be used if desired when the reaction time is shortened and the amount used in the reaction is controlled. Both crystallised periodic acid of the formula $H_5IO_6$ as well as periodic acid liberated in situ by means of mineral acids from periodates such as potassium periodate, $KIO_4$, can be used as periodic acid. On the other hand, the desired oxidation does not occur with periodates such as $KIO_4$ alone, i.e. in a neutral or basic reaction medium. Periodic acid and periodates have been used hitherto particularly as oxidising agents for the cleavage of glycols and other polyoles. Also, L. J. Dolby and D. L. Booth, J. Am. Chem. Soc. 88, 1049–1051 (1966) described oxidations of indole derivatives to ketones by means of periodic acid; among others N-methyl-tetrahydrocarbazole is oxidised to N-methyl-1-keto-tetrahydrocarbazole. The possibility of introducing a hydroxyl group into the 5-position of compounds of general Formula II by means of periodic acid could not have been foreseen from the above citation; much rather was a greater degree of oxidation to be expected.

If desired, compounds of general Formula I wherein the symbols A and B represent hydrogen and the hydroxy group can be oxidised with chromium trioxide into compound of the general Formula I, wherein A and B represent the oxo group.

The starting materials of general Formula II are obtained in good yields when a phenyl hydrazone of the general Formula IV

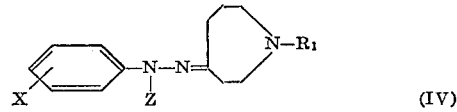

wherein Z represents the radical of the Formula V

wherein
Y and $R_2$ have the meanings given above, or
Z represents hydrogen, and
$R_1$ and X have the meanings given above and X is preferably in the m- or p-position, is treated with an acid condensing agent and then a reaction product wherein Z is hydrogen is reacted, in the presence of an alkaline condensing agent, with a reactive ester of a compound of general Formula VI

wherein Y and $R_2$ have the meanings given above.

As acid condensing agent for the first and, depending on the meaning of Z, also the only reaction step, acids as defined by Lewis are suitable, such as those usual for indole synthesis according to E. Fischer, e.g. hydrochloric acid in ethanol, dilute aqueous sulphuric acid, polyphosphoric acid, formic acid or zinc chloride or borofluoride etherate in glacial acetic acid. The ring is closed at room temperature to boiling temperature depending on the type of condensing agent and the medium.

The phenyl hydrazone of general Formula IV necessary for ring closure is formed advantageously from the corresponding phenyl hydrazine of general Formula VII

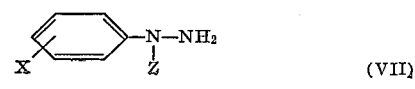

and a hexahydro-4H-azepin-4-one of general Formula VIII

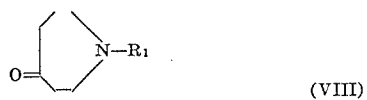

(VIII)

or a ketal thereof corresponding to the general Formula IX

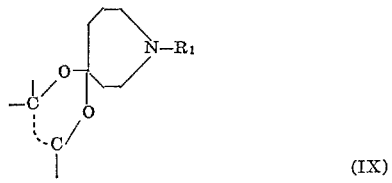

(IX)

in which formulae X, Z and $R_1$ have the meanings given above, or salts thereof. It is formed immediately before the ring closure in situ, either before adding the condensing agent by heating the components in the chosen reaction medium, or in the presence of a condensing agent. In the latter case, ring closure follows immediately, optionally with greater heating. As ketal groups in ketals of the general Formula VIII, advantageously geminal, low dialkoxy groups such as the geminal dimethoxy or geminal diethoxy grouping, or cyclic groups such as the ethylenedioxy or proplenedioxy grouping are used.

The use of a phenyl hydrazone of general Formula IV which is not just formed in situ but has been formed previously is of interest, for example, when the hydrazone formation can serve as a means for the separation of a phenyl hydrazine or a 1-substituted hexahydro-4H-azepin-4-one from a reaction mixture formed in their production. Compounds of the general Formulae VI, VII, VIII and IX are known and others can be produced analogously thereto.

To introduce a radical of the general Formula V into a cyclisation product wherein Z is hydrogen, this product is converted, e.g. by means of an alkaline condensing agent, into its alkali metal compound and the latter is reacted with, e.g. a benzyl halide or p-toluene sulphonic acid benzyl ester substituted corresponding to the definition of Y and $R_2$. Sodium hydride in inert solvents such as toluene, or the sodium compound of naphthalene formed in situ from naphthalene and sodium in tetrahydrofuran, as well as sodium in liquid ammonia, for example, can be used as alkaline condensing agents.

The new indole derivatives can be administered orally, rectally and parenterally. The dosages of the free bases or of pharmaceutically acceptable acid addition salts thereof have to be individualised and vary between 2 and 100 mg., preferably 5–50 mg. Suitable dosage units such as dragées (sugar coated tablets), suppositories or ampoules, preferably contain 2–25 mg. of an indole derivative produced according to the invention or of a pharmaceutically acceptable salt thereof.

By pharmaceutically acceptable acid addition salts of the bases usable according to the invention are meant addition salts with those acids, the anions of which in the usual dosages are pharmacologically acceptable, i.e. they have no toxic effects. In addition, it is of advantage if the salts to be used crystallise well and are not, or are only slightly, hygroscopic. Examples of pharmaceutically acceptable salts are the salts with hydrochloric acid, hydrobromic acid, sulphuric acid, phosphoric acid, methane sulphonic acid, ethane sulphonic acid, β-hydroxyethane sulphonic acid, acetic acid, lactic acid, oxalic acid, succinic acid, fumaric aid, maleic acid, malic acid, tartaric acid, citric acid, benzoic acid, salicyclic acid, phenylacetic acid, mandelic acid, embonic acid and naphthalene-1,5-disulphonic acid as well as salts with other substances having an acid reaction such as 8-chlorotheophyllin.

Dosage units for oral administration preferably contain between 1% and 90% of a compound of general Formula I or of a pharmaceutically acceptable acid addition salt thereof as active substance. They are produced by combining the active substance with, e.g. solid pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols of suitable molecular weights, to form tablets or dragée cores. The latter are coated, e.g. with concentrated sugar solutions which can also contain, e.g. gum arabic, talcum and/or titanium dioxide, or with a laquer dissolved in easily volatile organic solvents or mixtures of solvents. Dyestuffs can be added to these coatings, e.g. to distinguish between various dosages of active substance.

Examples of other forms for oral administration are also pastilles as well as dosages not made up into single dosages such as syrups and drops for the treatment of coughs prepared with the usual auxiliaries.

The following prescriptions further illustrate the production of tables and dragées:

(a) 250 g. of 3-methyl - 6 - benzyl-1,2,3,6-tetrahydro-azepino[4,5-b]-indol-5 (4H)-one are mixed with 175.80 g. of lactose and 169.70 g. of potato starch. The mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicon dioxide are mixed in and the mixture is pressed into 10,000 tablets each weighing 100 mg. and containing 25 mg. of active substance. If desired, the tablets can be grooved for better adaptation of the dosage.

(b) A granulate is prepared from 250 g. of 3-methyl-6-benzyl-1,2,3,4,5,6-hexahydro-azepino[4,5-b]indol - 5 - ol, 175.90 g. of lactose and the alcoholic solution of 10 g. of stearic acid. After drying the granulate is mixed with 56.60 g. of colloidal silicon dioxide, 165 g. of talcum, 20 g. of potato starch and 2.50 g. of magnesium stearate and the mixture is pressed into 10,000 dragée cores. These are then coated with a concentrated syrup made from 522.28 g. of crystallised saccharose, 6 g. of shellac, 10 g. of gum arabic, 215 g. of talcum, 15 g. of colloidal silicon dioxide, 0.22 g. of dyestuff and 1.5 g. of titanium dioxide, and dried. The dragées obtained each weight 145 mg. and contain 25 mg. of active substance.

Syrups and drops for the treatment of coughs are produced in the following manner:

20 g. of 3-methyl-6-(m-methoxybenzyl)-1,2,3,4,5,6-hexahydro-azepino[4,5-b]indol-5-ol hydrochloride, 42 g. of p-hydroxybenzoic acid methyl ester, 18 g. of p-hydroxybenzoic acid propyl ester and 5,000 g. of crystallized sugar and also any flavoring desired are dissolved in distilled water up to 10 liters to give a syrup.

(b) To produce drops for the treatment of coughs, 500 g. of 3 - methyl - 6 - benzyl - 9 - chloro-1,2,3,6-tetrahydro-azepino[4,5-b]indol-5(4H)-one hydrochloride, 10 g. of ascorbic acid, sweetner, e.g. 5 g. of sodium cyclamate, flavoring as desired and 2,500 g. of sorbitol (70%) are dissolved in distilled water up to 10 liters.

The following non-limitative examples further illustrate the production of the inventive compounds. The temperatures throughout the application are given in degrees centigrade, percentages are given by weight.

EXAMPLE 1

20 g. of 3-methyl-5-acetoxy-6-benzyl-1,2,3,4,5,6-hexahydro-azepino[4,5-b]indole in 100 ml. of 20% methanolic potassium hydroxide are refluxed for 1 hour. The solution is concentrated to half its volume under vacuum, diluted with 200 ml. of water and extracted with ether. The ether extract is dried over sodium sulphate and concentrated to a small volume. On rubbing, the 3-methyl-6-benzyl-1,2,3,4,5,6-hexahydro-azepino[4,5-b]indol-5-ol crystallises into colourless prisms which melt at 116–117°.

Without purifying the acetoxy compound, the following compounds are obtained analogously:

3-ethyl-6-benzyl-1,2,3,4,5,6-hexahydro-azepino[4,5-b] indol-5-ol, M.P. 103–105° (prisms, from ether);

3-ethyl-6-benzyl-8-methoxy-1,2,3,4,5,6-hexahydro-azepino[4,5-b]indol-5-ol, M.P. 85–87° (prisms, from ether);

3-methyl-6-(m-methoxybenzyl)-1,2,3,4,5,6-hexahydro-azepino[4,5-b]indol-5-ol, M.P. 132–134° (prisms, from ether);

3-methyl-6-benzyl-9-chloro-1,2,3,4,5,6-hexahydro-azepino[4,5-b]indol-5-ol, M.P. 134–135° (prisms from ether);

3-methyl-6-(m-methoxybenzyl)-8-methoxy-1,2,3,4,5,6-hexahydro-azepino[4,5-b]indol-5-ol, M.P. 118–120° (prisms from ether).

The starting material, 3-methyl-5-acetoxy-6-benzyl-1,2,3,4,5,6-hexahydro-azepino[4,5-b]indol, is prepared as follows:

(a) A solution of 200 g. of mercury-(II) acetate in 550 ml. of 5% acetic acid is added to a solution of 40 g. of 3 - methyl - 6 - benzyl - 1,2,3,4,5,6 - hexahydro - azepino [4,5-b]indole hydrochloride in 200 ml. of 5% acetic acid, the addition being made at 0–5° while stirring. The mercury-(I) acetate begins to separate out after a short time. The reaction mixture is stirred for, in all, 3 hours at room temperature and the precipitated mercury-(I) acetate (67 g.) is filtered off under suction and washed with a small amount of dilute acetic acid. Carbon disulphide is introduced into the filtrate until the excess mercury has completely precipitated. The mercury sulphide is filtered off under suction through a layer of kieselguhr and the filtrate is made alkaline with concentrated ammonia solution and then extracted three times with 250 ml. of ether each time. The ether extracts are combined, dried over sodium sulphate and concentrated to a small volume. On rubbing, the 3-methyl-5-acetoxy-6-benzyl-1,2,3,4,5,6 - hexahydro-azepino[4,5-b]indole crystallises into colourless prisms which melt at 110–112°. The remaining mother liquor yields 3-methyl - 6 - benzyl-1,2,3,4,5,6-hexahydro-azepino [4,5-b]indol-5-ol which melts at 116–117°.

Derivatives of 5-acetoxy-1,2,3,4,5,6-hexahydro-azepino [4,5-b]indole having the following further substituents in the 3- and 6-position as well as, optionally, in the aromatic ring are obtained in an analogous manner:

Substituents
3-ethyl-6-benzyl-
3-ethyl-6-benzyl-8-methoxy-
3-ethyl-6-benzyl-8-methyl-
3-ethyl-6-benzyl-10-methyl-
3-ethyl-6-benzyl-8-chloro-
3-ethyl-6-benzyl-10-chloro-
3-ethyl-6-benzyl-9-methyl-
3-ethyl-6-benzyl-9-chloro-
3-methyl-6-benzyl-9-chloro-
3-methyl-6-benzyl-8-chloro-
3-methyl-6-benzyl-10-chloro-
3-methyl-6-(o-chlorobenzyl)-
3-methyl-6-(m-methoxybenzyl)-
3-methyl-6-(m-methoxybenzyl)-8-methoxy-
3-ethyl-6-(p-chlorobenzyl)-
3-methyl-6-(1-phenylethyl)-

The substituted 1,2,3,4,5,6-hexahydro-azepino[4,5-b] indole hydrochlorides required as starting materials are produced, e.g., as follows:

(b) 117.4 g. of N¹-benzyl-phenylhydrazine hydrochloride are dissolved in 1000 ml. of abs. ethanol, 63.5 g. of 1-methyl-hexahydro-4H-azepin-4-one are added, the solution is cooled to 0° and dry hydrogen chloride is introduced in a quick stream until saturation is reached. The solution is then refluxed for 3 hours. After cooling, precipitated ammonium chloride is filtered off under suction, the filtrate is concentrated to dryness in vacuo, the residue is dissolved in 750 ml. of water, the solution is made alkaline with 20% potassium hydroxide solution and the liberated bases are extracted with ether. After drying the ether extract over potassium carbonate, it is concentrated and the residue is fractionated under 0.2 Torr. After taking a first fraction consisting of about 13 g. of parts boiling below 150°, the main product distills between 168 and 172°. The viscous reaction product is dissolved in 500 ml. of acetone and ethereal hydrochloric acid is added until it has completely precipitated. The precipitate consists of 3-methyl-6-benzyl-1,2,3,4,5,6-hexahydro-azepino[4,5-b]indole hydrochloride which melts at 201–202° (with decomposition).

Derivatives of 1,2,3,4,5,6 - hexahydro-azepino[4,5-b] indole having the following substituents in the 3- and 6-position as well as, optionally, in the aromatic ring are obtained in an analogous way:

| Substituents: | Hydrochloride M.P. |
|---|---|
| 3-ethyl-6-benzyl- | 223–228° |
| 3-ethyl-6-benzyl-8-methoxy- | 215–217° |
| 3-ethyl-6-benzyl-8-methyl- | 201–203° |
| 3-ethyl-6-benzyl-10-methyl- | 232–235° |
| 3-ethyl-6-benzyl-8-chloro- | 220–222° |
| 3-ethyl-6-benzyl-10-chloro- | 248–251° |
| 3-ethyl-6-benzyl-9-methyl- | 224–225° |
| 3-ethyl-6-benzyl-9-chloro- | 240–242° |
| 3-methyl-6-benzyl-9-chloro- | 248–249° |
| 3-methyl-6-benzyl-8-chloro- | 122–124° |
| 3-methyl-6-benzyl-10-chloro- | 223–225° |
| 3-methyl-6-(o-chlorobenzyl)- | 228–229° |
| 3-methyl-6-(m-methoxybenzyl)- | 191–193° |
| 3-ethyl-6-(p-chlorobenzyl)- | 215–216° |
| 3-methyl-6-(p-phenylethyl)- | 207–208° |

The pairs of compounds contained in the above list which differ only in the position of the substituent X, i.e. a methyl group or a chlorine atom in the 8- or 10-position, are produced starting from N¹-benzyl-m-tolyl hydrazine or N¹-benzyl-m-chlorophenyl hydrazine. The isomeric mixtures obtained are separated by chromatography on aluminium oxide, activity III according to Brockmann, by adsorbing the reaction products from a mixture of benzene and petroleum ether 1:1 and then eluting in fractions with benzene and then with mixtures of benzene and ether and finally converting into the hydrochlorides.

EXAMPLE 2

A solution of 3.26 g. of 3-methyl-6-benzyl-1,2,3,4,5,6-hexahydro-azepino[4,5-b]indole hydrochloride (cf. Example 1) in 100 ml. of methanol is added dropwise to a solution of 2.32 g. of periodic acid ($H_5IO_6$) in 100 ml. of methanol/water (1:1), the addition being made at 0° while stirring. The mixture is stirred for 4 hours at room temperature, the solution is concentrated under vacuum to half its volume, diluted with 100 ml. of water, made alkaline with 2 N sodium hydroxide solution and extracted with ether. The ether extract is extracted twice with 20 ml. of 2 N sulphuric acid each time and the acid aqueous phase is made alkaline with concentrated ammonia solution and extracted with ether. The ether extract is dried over sodium sulphate and concentrated. The residue of 2.55 g. is chromatographed on 125 g. of aluminium oxide, activity III according to Brockmann, 1.5 g. of non-reacted 3-methyl-6-benzyl-1,2,3,4,5,6-hexahydro-azepino[4,5-b]indole being first eluted with 500 ml. of benzene. 900 mg. of crude 3-methyl-6-benzyl-1,2,3,4,5,6-hexahydro-azepino[4,5-b]indol-5-ol are then eluted with 500 ml. of a mixture of ether/benzene (1:1). It is purified by recrystallisation from ether whereupon pure substance, melting at 116–117°, is obtained.

EXAMPLE 3

9 g. of finely pulverised chromium trioxide are carefully added in portions to 150 ml. of pyridine, the addition being made while cooling with ice and stirring. A solution of 9.2 g. of 3-methyl-6-benzyl-1,2,3,4,5,6-hexahydro-azepino[4,5-b]indole-5-ol in 90 ml. of pyridine is added dropwise to the suspension so produced, the addition being made within 20 minutes while stirring at 0°. The mixture is then stirred for 3 hours the temperature being allowed to rise to room temperature. The reaction mixture is then filtered on a chromatography column of 300 g. of aluminium oxide and the column is eluted with 2000 ml. of chloroform. The combined eluates are concentrated to dryness under vacuum, the residue is taken up in 100 ml. of ether, the solution is clarified by filtration over kieselguhr and extracted three times with 10 ml. of 2 N sulphuric acid each time. On rubbing the combined sulphuric acid extracts, 3-methyl-6-benzyl-1,2,3,6-tetrahydro-azepino[4,5-b]indol - 5(4H) - one hydrogen sulphate crystallises. Recrystallised from methanol/acetone, it is obtained as colourless platelets which melt at 203–205°.

Derivatives of 1,2,3,6-tetrahydro-azepino[4,5-b]indol-5(4H)-one as hydrogen sulphates having the following substituents in the 3- and 6-position and, optionally, in the aromatic ring, are obtained analogously:

Substituents
3-ethyl-6-benzyl
3-ethyl-6-benzyl-8-methoxy-
3-ethyl-6-benzyl-8-methyl-
3-ethyl-6-benzyl-10-methyl-
3-ethyl-6-benzyl-8-chloro-
3-ethyl-6-benzyl-10-chloro-
3-ethyl-6-benzyl-9-methyl-
  M.P. 199–200° (sulphate)
  M.P. 191–195° (hydrochloride)
3-ethyl-6-benzyl-9-chloro-
3-methyl-6-benzyl-9-chloro-
3-methyl-6-benzyl-8-chloro-
3-methyl-6-benzyl-10-chloro-
3-methyl-6-(o-chlorobenzyl)-
3-methyl-6-(m-methoxybenzyl)-
  M.P. 170–172° (sulphate)
3-ethyl-6-(p-chlorobenzyl)-
3-methyl-6-(1-phenylethyl)-

What is claimed is:
1. A compound of the formula:

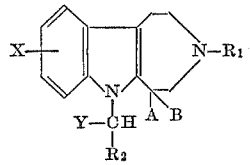

wherein one of A and B is hydrogen and the other is hydroxy or taken together A and B are oxo;
X is hydrogen, halogen up to the atomic number 35, lower alkyl or lower alkoxy,
Y is phenyl or phenyl substituted by halogen up to the atomic number 35, lower alkyl or lower alkoxy,
$R_1$ is lower alkyl or benzyl, and
$R_2$ is hydrogen or lower alkyl, and
the pharmaceutically acceptable acid addition salts thereof.

2. A compound as defined in claim 1 wherein
X is hydrogen or chlorine,
Y is phenyl or phenyl substituted by lower alkoxy,
$R_1$ is lower alkyl, and
$R_2$ is hydrogen, and
the pharmaceutically acceptable acid addition salts thereof.

3. A compound as defined in claim 1 which is:
3-methyl-6-benzyl-1,2,3,4,5,6-hexahydro-azepino[4,5-b]-indol-5-ol.

4. A compound as defined in claim 1 which is:
3-ethyl-6-benzyl-1,2,3,4,5,6-hexahydro-azepino[4,5-b]-indol-5-ol.

5. A compound as defined in claim 1 which is:
3-methyl-6-(m-methoxybenzyl)-1,2,3,4,5,6-hexahydro-azepino[4,5-b]indol-5-ol.

6. A compound as defined in claim 1 which is:
3-methyl-6-benzyl-9-chloro-1,2,3,4,5,6-hexahydro-azepino[4,5-b]indol-5-ol.

7. A compound as defined in claim 1 which is:
3-methyl-6-benzyl-1,2,3,6-tetrahydro-azepino-[4,5-b]indol-5(4H)-one.

8. A compound as defined in claim 1 which is:
3-methyl-6-(m-methoxybenzyl)-1,2,3,6-tetrahydro-azepino[4,5-b]indol-5(4H)-one.

9. A compound as defined in claim 1 which is:
3-methyl-6-benzyl-9-chloro-1,2,3,6-tetrahydro-azepino[4,5-b]indol-5(4H)-one.

References Cited

UNITED STATES PATENTS 3,419,569  12/1968  Renner _____ 260—296

ALEX MAZEL, Primary Examiner

J. A. NARCAVAGE, Assistant Examiner

U.S. Cl. X.R.

260—253, 326.3, 326.9; 424—274